Sept. 10, 1968  J. E. McEVOY  3,400,638
OVERPRESSURE SEAL FOR DIFFERENTIAL PRESSURE RESPONSIVE DEVICE
Filed Nov. 7, 1966
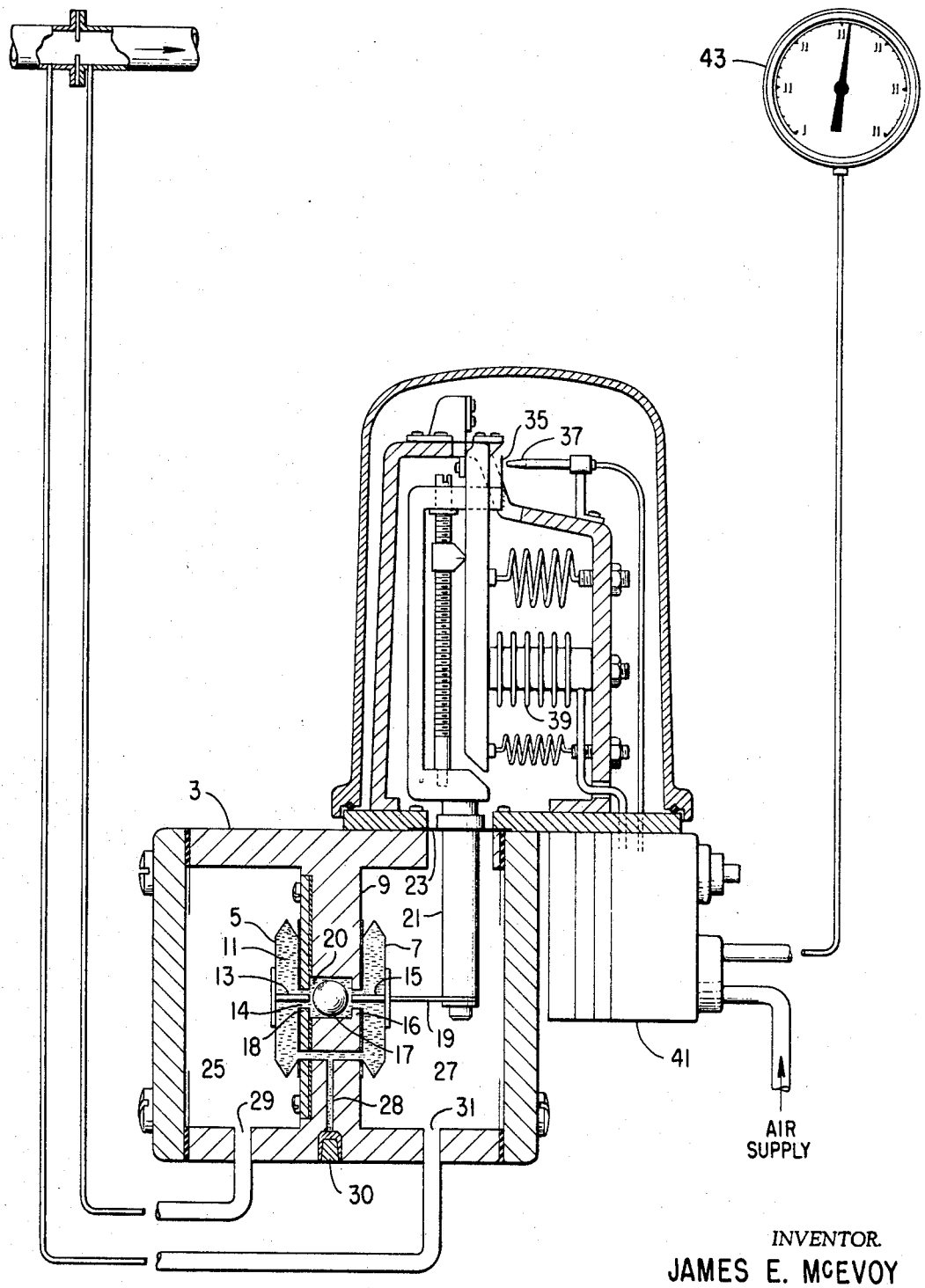
INVENTOR.
JAMES E. McEVOY
BY
ATTORNEY excerpt of a United States Patent

United States Patent Office

3,400,638
Patented Sept. 10, 1968

3,400,638
OVERPRESSURE SEAL FOR DIFFERENTIAL PRESSURE RESPONSIVE DEVICE
James E. McEvoy, South Euclid, Ohio, assignor to Bailey Meter Company, a corporation of Delaware
Filed Nov. 7, 1966, Ser. No. 592,528
5 Claims. (Cl. 92—10)

ABSTRACT OF THE DISCLOSURE

A differential pressure responsive device having two bellows attached to a partition wall and enclosing a body of liquid. The partition wall has a passageway connecting the interiors of the bellows and is provided with a free floating valve acting as an overpressure seal.

---

This invention relates to a differential pressure responsive device of the opposed bellows operated type and more specifically to an overpressure seal for such differential responsive devices.

The conventional bellows capsule is characterized by a central partition having two opposed bellows mounted thereon. These bellows, each consisting of many convolutions, have their interiors in communication with each other and are filled with an incompressible fluid. The outer ends of the bellows are joined internally at their centers by a connecting stem passing freely through the central partition. Valve members are mounted on the connecting stem in each chamber and mating seats are provided in the respective sides of the central partition. Under normal operating conditions, the valves are open to permit free flow of the incompressible fluid between the bellow chambers as the outer ends of the bellows move in unison in response to changes in differential pressure. However, when either bellows is subjected to overpressure, the stem movement causes the respective valve member to seat on the central partition thereby isolating the bellow chambers and preventing further flow of the incompressible fluid. The isolation of the bellows, which results in trapping the fluid in each bellows, thereby maintaining a constant volume, protects the bellows from sustaining damage due to overpressure.

In this double bellows liquid fill arrangement for overpressure protection considerable motion is required for the valve members to seat properly. This necessity for considerable stem motion requires sensing bellows of many convolutions. A seal that requires considerable stem movement and thus a bellows of many convolutions results in undesirable increase in capsule size and cost as well as undesirable increase in internal volume. Furthermore, a sensing bellows consisting of many convolutions increases the likelihood of sediment or particles depositing on the surface of the bellows. The presence of this foreign matter may partially restrict the movement of the bellows in response to a differential pressure change and thereby introduce a change or error in the relationship between pressure differential and bellows movement, or the weight thereof may cause an appreciable error in the calibration of the unit.

The requirement for many convolutions necessitates a large volume of incompressible fluid. Such fluid is sensitive to fluctuations in temperature as manifested by an increase in volume due to an increase in temperature. Fluid expansion causes a build-up of internal pressure resulting in movement of the free outer ends of the bellows. In most two-chamber designs, the force beam, which transmits the bellow motion to an external transmitter generating an electric or pneumatic output signal, is connected to the free outer end of one of the bellows. Therefore, the internal pressure build-up due to increase in temperature will cause movement of the force beam. Such a movement is not the result of a change in pressure differential and results in the signal generated by the transmitter being in error.

Differential pressure responsive devices of the type here under discussion are quite commonly used in a "force-balance" transmitter wherein the force produced by the differential pressure acting on the bellows capsule is opposed by an equal and opposite force applied externally to the pressure housing. As a matter of fact, I will describe my invention for use in a transmitter of this type. In such a transmitter, the bellows motion required during normal operation is minute as it is essentially a null-balance device. Therefore, any appreciable motion of the bellows required to operate the overpressure seal usually requires a "break-away" linkage or some other form of lost motion protective mechanism to maintain the null-balance mechanism within operating range, hence adding considerably to the cost and complication of the transmitter.

One object of the present invention is to provide an improved bellows operated pressure responsive device which is, for example, responsive to the differential between the pressures upstream and downstream with respect to an orifice plate, nozzle or Venturi tube.

Another object of my invention is to reduce the required number of bellows convolutions.

Another object of my invention is to provide improved overpressure protection of the sensing capsules.

Still another object of my invention is to reduce the effect on output signal caused by changes in temperature of the incompressible fluid with which the bellows capsules is filled.

A further object of my invention is to minimize the deleterious effect of the deposition of sediment on the sensing capsules.

My improved differential pressure responsive device consists of two bellows capsules sealed to opposite sides of a back-up plate. The capsules are mounted in opposition to one another with their remote ends free to respond to pressure changes. The capsules are in communication internally by means of a passage through the back-up plate and the internal volume created by the essembly of capsules and back-up plate is filled with an incompressible fluid.

The back-up plate establishes two separate chambers in the pressure housing and the free-moving end of each capsule is sensitive to the pressure existing in its respective chamber. Since the capsules are mounted in opposition to one another, the net bellows displacement, representing the differential pressure, causes a movement in a force beam which is attached to the free-moving end of one capsule. The movement of the force beam creates an unbalance in an associated transmitter which produces an output signal proportional to the differential pressure.

A push rod is attached internally to the center of the free-moving end of each bellows capsule and is of such length as to penetrate slightly a shoulder at the entrance to the passage in the back-up plate.

The shoulders at either end of the passage in the back-up plate serve to retain a sealing ball which is free floating in a chamber within the back-up plate. During normal operating conditions, the ball and rod arrangement permits fluid to flow from one capsule bellows to the other as the capsules respond to varying pressure differential. However, during excess pressure periods, the inner surface of the shoulders act as valve seats for the ball which cooperate to form a novel means for protecting the bellows capsules from sustaining damage due to an overpressure condition.

This overpressure protection is accomplished by the bellows, under the excess pressure condition, forcing the respective push rod against sealing ball, the movement of the push rod seating the sealing ball on the shoulder seat in the back-up plate. After the ball is seated, thus preventing any substantial further flow of fluid into the lower pressure bellows capsule, any further pressure exerted against the bellows capsule creates a slight movement of the bellows, but the decrease in volume produces a relatively large displacement of hydraulic fluid which is available for additionally forcing the ball against the seat thereby insuring a positive leak-proof seal and protection from bellows damage.

Referring to the drawing, I show my novel differential pressure responsive device arranged to operate a pneumatic force balance transmitter. The transmitter, responding to the pressure differential sensed by the bellows capsule transmits a signal to an indicator which displays a visual indication of the sensed process pressure differential.

While the bellows capsule differential pressure responsive device and other features of the present invention will be discussed in connection with a pneumatic force balance transmitter, it will be understood that it is equally applicable to an electric transmitter and that the signal output of the transmitter may, in addition to operating an indicator, operate a recorder, integrator, control device or the like.

In the general operation of the system of the drawing, a pressure differential of a process fluid is measured as it would appear, for example, across an orifice, flow nozzle or Venturi tube. The pressure differential is conveyed through pressure ports 29 and 31 to sensing capsules 5 and 7 respectively. Movement of the sensing capsules 5 and 7, due to variations in the pressure differential existing between pressure chambers 25 and 27, is conveyed to one end of a force beam 21 by way of connecting strap 19. The force beam 21 passes through a sealing diaphragm 23 which, in addition to sealing the chamber 27, acts as a fulcrum for the force beam 21. The opposite end of the force beam 21 carries a vane 35 of a vane-nozzle fluid pressure couple. The nozzle 37 of this couple is rigidly fastened to the transmitter housing and a pipe extends from the nozzle to a booster 41.

The vane 35 is maintained in spaced relationship with the nozzle 37 and any change in this relationship causes the output of the booster to change accordingly. The output pressure is fed back to a bellows 39 for restoring the position of the force beam 21 and re-establishing the original vane-nozzle relationship. The output pressure is also transmitted to an indicator 43 representing a typical receiving device.

The single convolution bellows capsules 5 and 7 are sealed to either side of a back-up plate 9. The capsules 5 and 7 are mounted opposing each other and are maintained in communication with each other during normal operating conditions by way of a passage 14 in the back-up plate 9. In fabricating the bellows capsule, the internal volume of the bellows capsule 5 and 7 and the back-up plate passage 14 is subjected to a hard vacuum and then filled with an incompressible fluid 11 through a fill port 28. Having completely filled the internal volume, a fill port seal cap 30 is inserted. The process fluid fills the pressure chambers 25 and 27 through pressure ports 29 and 31 respectively and acts on the surfaces of the bellows capsules 5 and 7. The incompressible fluid 11 insures positive, instantaneous transmission of motion of one bellows capsule to the other in response to a change in pressure differential.

The overpressure protective scheme incorporated in the differential pressure responsive device to prevent overpressure damage to the bellows capsules consists of two bellows push rods and a free floating ball seal. As shown in the drawing, push rods 13 and 15 are fixed to the centers of the free-moving ends of the bellows capsules 5 and 7. The size of the push rods 13 and 15 is such as to permit them to penetrate shoulders 16 and 18 of the back-up plate passage 14 during normal operation. Sufficient clearance is maintained between the push rods 13 and 15 and the shoulders of the back-up plate 9 to permit the incompressible fluid 11 to pass freely between bellows capsules 5 and 7.

Within the back-up plate 9 is a center chamber 20 which, in conjunction with the shoulders 16 and 18, retain a free floating compressible sealing ball 17. The clearance established between the center chamber 20 and the sealing ball 17 permits flow of the incompressible fluid 11 between bellows capsules 5 and 7 during normal differential pressures. The internal surfaces of the back-up plate shoulders 16 and 18 serve as valve seats for the sealing ball during periods of excess overpressure.

In order to more clearly understand the operation of the overpressure protective scheme, a hypothetical situation will be assumed. If the pressure in chamber 25 exceeds the pressure in chamber 27 by an amount greater than the calibrated full range value, the movement of bellows capsule 5 positions push rod 13 against the sealing ball 17 until the sealing ball seats on shoulder 16. The sealing ball 17 having seated on the shoulder 16, the flow of incompressible fluid from bellows capsule 5 to bellows capsule 7 is sealed off thereby isolating the bellows capsules and trapping the incompressible fluid. The isolation of the bellows capsules 5 and 7 prevents bellows damage which would result if bellows capsule 5 were permitted to collapse completely thereby forcing bellows capsule 7 to accept an excessive amount of displaced incompressible fluid.

If the seating of sealing ball 17, by the operation so far described, is not perfect, resulting in a leakage of fluid from capsule 5 to capsule 7, the pressure in chamber 25 of the capsule 5 will cause a further decrease in internal volume which will cause a displacement of fluid into the chamber 20. The fluid so displaced further compresses the sealing ball 17 against shoulder 16. Because of the difference in areas of the capsule 5 and chamber 20, a relatively minute movement of the free end of capsule 5 will displace sufficient fluid into chamber 20 to cause an appreciable compression of the ball 17, if required, to seal perfectly the passage between capsule 5 and capsule 7.

To produce a comparable compression of the ball 17 by means of conventional designs presently available, which mechanically attach the movable member of the sealing valve connecting stem between the bellows, the bellows motion would be considerably greater, as the ball movement would be exactly equal to the movement of the free end of the bellows.

The foregoing discussion would apply equally to a reversal of the overpressure condition, bearing in mind that the system reactions would also be reversed.

Various changes may be made in the details of construction without departing from the spirit and scope of my invention as defined by the appended claims.

What I claim as new and desire to secure by Letters Patent of the United States is:

1. A differential pressure responsive device comprising a housing, a partition dividing said housing into two compartments, two opposed bellows of relatively large area having their adjacent ends sealed to opposite sides of said partition and their opposite ends movable in accordance with changes in the difference in pressure between said compartments, a passageway through said partition having a relatively small area with respect to the effective areas of said bellows, said bellows and said passageway being filled with an incompressible liquid, and a free floating valve means for sealing said passageway upon an excessive difference in pressure between said compartments operated by the displacement of hydraulic fluid from the bellows compressed by said excessive difference in pressure into said passageway, the difference between the effective area of said last said bellows and said passageway making available a relatively large volume of incompressible fluid upon compression of said last named bellows for displacement into said passageway for operating said valve means to effectively seal said passageway.

2. A differential pressure responsive device according to claim 1 wherein said passageway includes a chamber and said valve means seats against an internal wall of said chamber to seal said passageway.

3. A differential pressure responsive device according to claim 2 wherein the movable end of each of said bellows is provided with a push rod for initially moving said valve means against the wall of said chamber upon the difference in pressure between said compartments becoming excessive.

4. A differential pressure responsive device according to claim 3 wherein said valve means is a ball confined and freely movable in said chamber.

5. A differential pressure device according to claim 4 wherein said ball is made of elastic material deformable against a wall of the chamber by the displacement of hydraulic fluid from a bellows into said chamber upon the difference in pressure between said chambers becoming excessive.

References Cited

UNITED STATES PATENTS

| | | | |
|---|---|---|---|
| 2,552,766 | 5/1951 | Bowar | 92—38 X |
| 2,590,324 | 3/1952 | Jones | 92—10 X |
| 2,659,390 | 11/1953 | MacLea et al. | 92—38 X |
| 2,770,258 | 11/1956 | Bowditch | 92—97 |
| 2,917,081 | 12/1959 | Nolte | 92—38 X |
| 2,959,963 | 11/1960 | Watrous | 73—407 |
| 2,977,991 | 4/1961 | Bauer | 73—407 X |
| 3,290,945 | 12/1966 | Yao Tzu Li et al. | 73—407 |

MARTIN P. SCHWADRON, *Primary Examiner.*

I. C. COHEN, *Assistant Examiner.*